Nov. 11, 1924.　　　　　　1,515,475
J. O. GOODWIN
METHOD AND APPARATUS FOR VULCANIZING SPONGE RUBBER ARTICLES
Filed Aug. 14, 1922

Inventor
John O. Goodwin
By Robert M. Pierson
Atty.

Patented Nov. 11, 1924.

1,515,475

UNITED STATES PATENT OFFICE.

JOHN O. GOODWIN, OF AKRON, OHIO, ASSIGNOR TO THE B. F. GOODRICH COMPANY, OF NEW YORK, N. Y., A CORPORATION OF NEW YORK.

METHOD AND APPARATUS FOR VULCANIZING SPONGE RUBBER ARTICLES.

Application filed August 14, 1922. Serial No. 581,577.

*To all whom it may concern:*

Be it known that I, JOHN O. GOODWIN, a citizen of the United States, residing at Akron, in the county of Summit and State of Ohio, have invented a certain new and useful Method and Apparatus for Vulcanizing Sponge Rubber Articles, of which the following is a specification.

This invention relates to means for vulcanizing sponge-rubber articles such, for example, as blocks or slabs of hard, cellular rubber adapted for heat insulation in refrigerators. Sponge rubber is ordinarily made by placing the blank in a mold cavity having a volume greater than its own, applying vulcanizing heat and allowing the stock to swell and fill the cavity. It is found that this method does not always give sharp outlines particularly when the stock is sulphurized for making hard cellular rubber, and if the blank is made broad enough in one plane to fill out to the sides of the cavity before reaching the top of said cavity, the top surface will present a more or less wrinkled and folded appearance in the finished article.

My invention aims to overcome these difficulties and it consists in the method and apparatus hereinafter claimed, of which a simple embodiment will now be described.

Of the accompanying drawings, Fig. 1 is a perspective view, partly broken away and in section, showing a mold constructed according to and adapted to carry out my invention, with the blank of sponge-rubber-forming stock in place therein.

Figure 1:
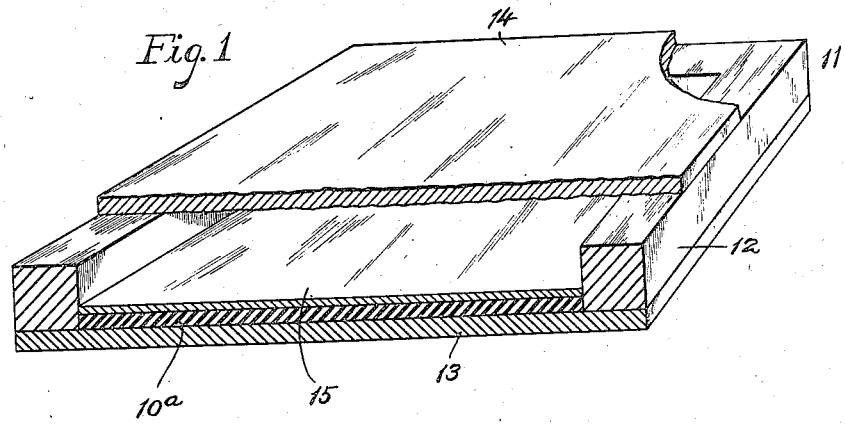
Figure 2:
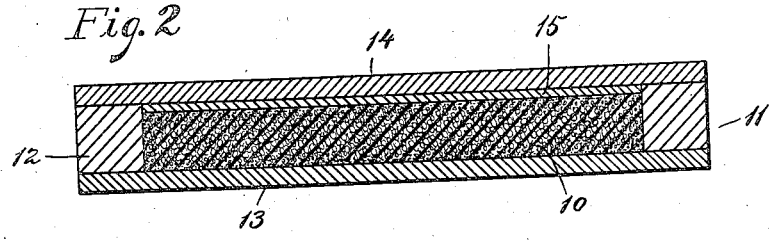
Fig. 2 is a cross-section of the mold showing the stock expanded to its ultimate volume.
Figure 3:
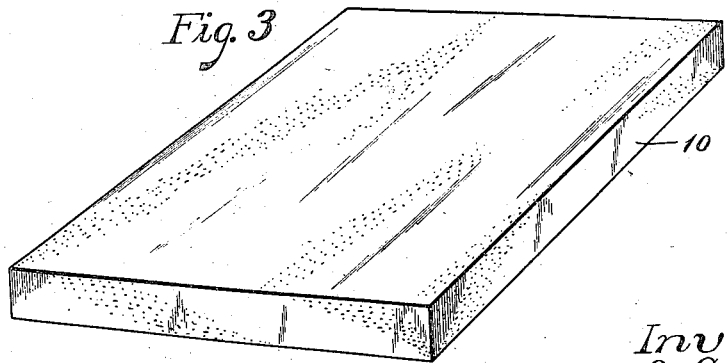
Fig. 3 is a perspective view of the finished product.

In the drawings, 10 is the finished product in the form of a rectangular prism, block or slab of cellular hard rubber, suitable for heat insulation in refrigerators. 11 is the vulcanizing mold comprising a metal frame 12 forming four sides of the molding cavity, a bottom plate 13 forming the lower side of the molding cavity, a removable cover 14 (which could be substituted by the top platen of the vulcanizing press), and a rectangular floating plate 15 slidingly fitted within the opening of the frame 12, with but slight clearance from the sides thereof and forming the top wall of the molding cavity. There is thus provided a molding cavity having six rigid walls, of which the top wall is movable to enlarge the volume of said cavity conformably with the expansion of the stock up to a predetermined limit.

In the operation of my invention a blank 10$^a$ of the sponge-rubber stock, having substantially the same shape and horizontal dimensions as the molding cavity is placed in the bottom of said cavity, and the floating mold plate 15 is placed thereon, as indicated in Fig. 1, so that the stock substantially fills said molding cavity. The cover is then applied and the mold is placed between the platens of a hot-plate press and heat is applied, or the mold is clamped together and placed in open steam, which causes the gasifying substance in the stock to expand the latter. The floating plate 15 rises until it meets the cover plate 14 and the vulcanization then continues at fixed volume, said floating plate serving to form a smooth top surface on the finished article in place of the wrinkled surface which has heretofore been encountered in attempting to mold the blocks 10 with sharp outlines. After the vulcanization is complete, the mold is opened and the block 10 removed therefrom.

It will be understood that various modifications may be made within the scope of my invention.

I claim:

1. The method of molding a sponge rubber article which comprises contacting the blank on all sides with rigid walls, and expanding and vulcanizing it by heat while so contacted.

2. The method of molding a sponge-rubber article which comprises inserting, in an expansible, rigid-walled vulcanizing cavity, a blank which substantially fills said cavity, heating the blank while allowing the cavity to enlarge conformably with the expansion of the blank up to a predetermined volume, and then arresting further expansion while completing the vulcanization.

3. A rubber-vulcanizing mold having a rigid wall adapted automatically to yield to the expansion of the contents, and means for limiting the yielding movement.

4. A mold for vulcanizing a sponge-rubber article, said mold including a floating plate forming the top wall of the molding cavity.

5. A mold for vulcanizing a sponge-rubber article, said mold having parallel, vertical side walls, a bottom wall in fixed relation thereto, and a floating top wall substantially filling the space between said side walls.

In witness whereof I have hereunto set my hand this 10 day of August, 1922.

JOHN O. GOODWIN.